(12) United States Patent
Carberry et al.

(10) Patent No.: US 9,939,800 B2
(45) Date of Patent: *Apr. 10, 2018

(54) PATH FOLLOWING MACHINING METHOD AND APPARATUS

(71) Applicant: BAE Systems Plc, London (GB)

(72) Inventors: Jonathan Michael Carberry, Balserstone (GB); Austin James Cook, Balderstone (GB); David McMillan, Clinton Township, MI (US); Aron Derecichei, Clinton Township, MI (US); Craig Ashmore, Clinton Township, MI (US)

(73) Assignee: BAE SYSTEMS PLC, London (GB)

( * ) Notice: Subject to any disclaimer, the term of this patent is extended or adjusted under 35 U.S.C. 154(b) by 364 days.

This patent is subject to a terminal disclaimer.

(21) Appl. No.: 14/700,231

(22) Filed: Apr. 30, 2015

(65) Prior Publication Data

US 2016/0320766 A1 Nov. 3, 2016

(51) Int. Cl.
*G06F 19/00* (2011.01)
*G05B 19/31* (2006.01)
(Continued)

(52) U.S. Cl.
CPC ............ *G05B 19/31* (2013.01); *B25J 9/1676* (2013.01); *G05B 19/402* (2013.01);
(Continued)

(58) Field of Classification Search
CPC .............. B25J 9/1676; G05B 19/4061; G05B 19/4065; G05B 19/4067;
(Continued)

(56) References Cited

U.S. PATENT DOCUMENTS 4,604,705 A  8/1986  Imanishi
4,723,219 A * 2/1988  Beyer ................ G05B 19/4067
                                                318/572
(Continued)

FOREIGN PATENT DOCUMENTS

GB         1200119 A      9/1970

OTHER PUBLICATIONS

EP Search Report for Appl No. EP15275191.3 dated May 12, 2016, 9 pages.
(Continued)

*Primary Examiner* — Thomas Lee
*Assistant Examiner* — Zhipeng Wang
(74) *Attorney, Agent, or Firm* — Maine Cernota & Rardin

(57) ABSTRACT

Disclosed is a method and apparatus for machining a workpiece (2). The method comprises specifying a path along which a cutting tool (6) is moved during machining the workpiece (2), the path comprising segments (26); defining, for each segment (26), an exit point on that segment (26); defining, for each segment (26), an exit path (38) from the exit point of that segment (26) to a point remote from the workpiece (2); performing a machining process including moving the cutting tool (6) along the tool path and machining the workpiece (2); and, during the machining process, when one or more criteria are satisfied: interrupting the machining process and, without machining the workpiece (2), moving the cutting tool (6) to the exit point of the current segment (26) and then along the exit path (38) of the current segment (26).

11 Claims, 3 Drawing Sheets

(51) Int. Cl.
*B25J 9/16* (2006.01)
*G05B 19/4061* (2006.01)
*G05B 19/4065* (2006.01)
*G05B 19/4067* (2006.01)
*G05B 19/402* (2006.01)

(52) U.S. Cl.
CPC ..... *G05B 19/4061* (2013.01); *G05B 19/4065* (2013.01); *G05B 19/4067* (2013.01); *G05B 2219/49146* (2013.01); *G05B 2219/49372* (2013.01); *G05B 2219/50109* (2013.01); *G05B 2219/50111* (2013.01)

(58) Field of Classification Search
CPC ........... G05B 2219/49146; G05B 2219/50108; G05B 2219/50109; G05B 2219/50111; G05B 2219/50112; G05B 15/02; G05B 19/23; G05B 19/31; G05B 19/402; G05B 2219/36342
See application file for complete search history.

(56) References Cited

U.S. PATENT DOCUMENTS

| | | | | |
|---|---|---|---|---|
| 5,825,655 | A | * | 10/1998 | Nakagawa ......... G05B 19/4067 700/175 |
| 2006/0009878 | A1 | * | 1/2006 | Kobayashi ............. B25J 9/1671 700/245 |
| 2014/0075754 | A1 | * | 3/2014 | Barron ................. G05B 19/402 29/888.012 |
| 2014/0156057 | A1 | * | 6/2014 | Tong .................. G05B 19/4065 700/175 |

OTHER PUBLICATIONS

EP Search Report for Appl No. EP15275192.1 dated May 12, 2016, 10 pages.
EP Search Report of Appl No. EP15275191 dated May 12, 2016.
URL: http://www.kuka-robotics.com/products/industrial-robots/heavy/kr360_fortec/kr360_42830/start.htm dated Nov. 25, 2015.

* cited by examiner

PATH FOLLOWING MACHINING METHOD AND APPARATUS

FIELD OF THE INVENTION

The present invention relates to the machining of workpieces.

BACKGROUND OF THE INVENTION

In the field of aircraft construction, cutting tools, such as drill bits, are used to perform machining operations on aircraft parts. For example, predrilled holes in aircraft panels may be countersunk so that fasteners used to fasten the aircraft panel to the structure are flush with a surface of the panel (e.g. the outer surface of the aircraft).

Due to regular operation, cutting tools wear which may cause them to fail. It is desirable to change cutting tools prior to the failure of cutting tools.

SUMMARY OF THE INVENTION

In order to change a cutting tool, typically the device to which the cutting tool is attached (for example, a robot arm) has to be moved away from the object being machined and any fixture system supporting the object. The present inventors have realized that for some objects and fixture systems, especially those having high curvature or complex shapes such as an aircraft center arch panel, standard retractions of the cutting apparatus from the object surface tend to introduce a high risk of the cutting apparatus impacting with the object and/or support fixture. Such collisions may result in damage to the cutting apparatus and/or the object being machined. The present inventors have realized that there is a need for improving automatic tool change operations.

The present inventors have further realized that, for many cutting tools, at least some useful tool life is used. The present inventors have realized a need for improving cutting tool usage.

The present inventors have further realized that a preprogrammed tool change process that avoids collision tends to decrease engineer workload and cost.

In a first aspect, the present invention provides a method of machining a workpiece. The method comprises: specifying a tool path for a cutting tool, the tool path being a path along which a cutting tool is to be moved during machining, by the cutting tool, of the workpiece, wherein the tool path comprises a plurality of tool path segments; defining, for each tool path segment, an exit point, wherein the exit point of a tool path segment is a point on that tool path segment; defining, for each tool path segment, an exit path, wherein the exit path of a tool path segment is a path for the cutting tool from the exit point of that tool path segment to a point that is remote from the workpiece; performing a machining process including moving the cutting tool along at least part of the tool path and machining, by the cutting tool, the workpiece; and, during the machining process, responsive to determining that one or more criteria are satisfied: interrupting the machining process and moving the cutting tool along a current tool path segment without machining the workpiece, from a current location of the cutting tool to the exit point of the current tool path segment; and moving the cutting tool along the exit path of the current tool path segment.

The one or more criteria may comprise a criterion that a tool life of the cutting tool is equal to a predetermined threshold value, for example, zero.

The method may further comprise, after the cutting tool has been moved along the exit path of the current tool path segment, replacing the cutting tool with a further cutting tool.

The method may further comprise: defining, for each tool path segment, an entry point, wherein the entry point of a tool path segment is a point on that tool path segment; defining, for each tool path segment, an entry path, wherein the entry path of a tool path segment is a path for the cutting tool or a further cutting tool from a point that is remote from the workpiece to the entry point of that tool path segment; and, after the cutting tool has been moved along the exit path of the current tool path segment, controlling the cutting tool or a further cutting tool to move along the entry path of the current tool path segment to the entry point of the current tool path segment.

The method may further comprise, thereafter, controlling the cutting tool or the further cutting tool to move along the current tool path segment without machining the workpiece, from the entry point of the current tool path segment to the location of the cutting tool when the machining process was interrupted. The method may further comprise, thereafter, resuming the machining process.

The method may further comprise specifying a sequence comprising a plurality of machining points along the tool path, each machining point being a point along the tool path at which a respective feature (e.g. a hole, or a countersink) is to be machined into the workpiece, wherein each tool path segment includes one or more machining points.

The machining process may include, for each of the machining points the cutting tool is moved to, controlling the cutting tool to machine the corresponding feature into the workpiece. The method may further comprise, for each feature machined by the cutting tool, modifying a tool life value of the cutting tool. The one or more criteria may comprise a criterion that a tool life of the cutting tool is equal to a predetermined threshold value.

The exit point of a tool path segment may be located at or proximate to a last machining point within that tool path segment.

The method may further comprise: defining, for each tool path segment, an entry point, wherein the entry point of a tool path segment is a point on that tool path segment; and defining, for each tool path segment, an entry path, wherein the entry path of a tool path segment is a path for the cutting tool from a point that is remote from the workpiece to the entry point of that tool path segment. The entry point of a tool path segment may be located at or proximate to a first machining point within that tool path segment.

The machining process may include, for each of the machining points the cutting tool is moved to, controlling the cutting tool to machine the corresponding feature into the workpiece. The method may further comprise: for each machining point, assigning, to that machining point, either a first label or a second label, wherein the first label is assigned to a machining point if the feature corresponding to that machining point has not been machined, and the second label is assigned to a machining point if the feature corresponding to that machining point has been machined; defining, for each tool path segment, an entry point, wherein the entry point of a tool path segment is a point on that tool path segment; defining, for each tool path segment, an entry path, wherein the entry path of a tool path segment is a path for the cutting tool from a point that is remote from the workpiece to the entry point of that tool path segment; responsive to determining that one or more criteria are satisfied, identifying the first machining point in the sequence to which the first label is assigned; and, after the cutting tool has been moved along the exit path of the current tool path segment, moving the cutting tool along the entry path of the tool path segment containing the identified machining point to the entry point of the tool path segment containing the identified machining point.

In a further aspect, the present invention provides an aircraft component machined using a method according to any of the above aspects.

In a further aspect, the present invention provides apparatus for machining a workpiece. The apparatus comprises: machining apparatus including a cutting tool; one or more processors configured to store: a tool path for a cutting tool, the tool path being a path along which a cutting tool is to be moved during machining, by the cutting tool, of the workpiece, wherein the tool path comprises a plurality of tool path segments, each segment comprising exit point, wherein the exit point of a tool path segment is a point on that tool path segment; and, for each tool path segment, an exit path, wherein the exit path of a tool path segment is a path for the cutting tool from the exit point of that tool path segment to a point that is remote from the workpiece; a controller operatively coupled to the processor and the machining apparatus and configured to: control the machining apparatus to move the cutting tool along at least part of the tool path and to machine the workpiece; and, responsive to determining that one or more criteria are satisfied: control the machining apparatus to move the cutting tool along a current tool path segment without machining the workpiece, from a current location of the cutting tool to the exit point of the current tool path segment; and control the machining apparatus to move the cutting tool along the exit path of the current tool path segment.

In a further aspect, the present invention provides a program or plurality of programs arranged such that when executed by a computer system or one or more processors it/they cause the computer system or the one or more processors to operate in accordance with any of the above aspects.

In a further aspect, the present invention provides a non-transient machine readable storage medium storing a program or at least one of the plurality of programs according to the preceding aspect.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
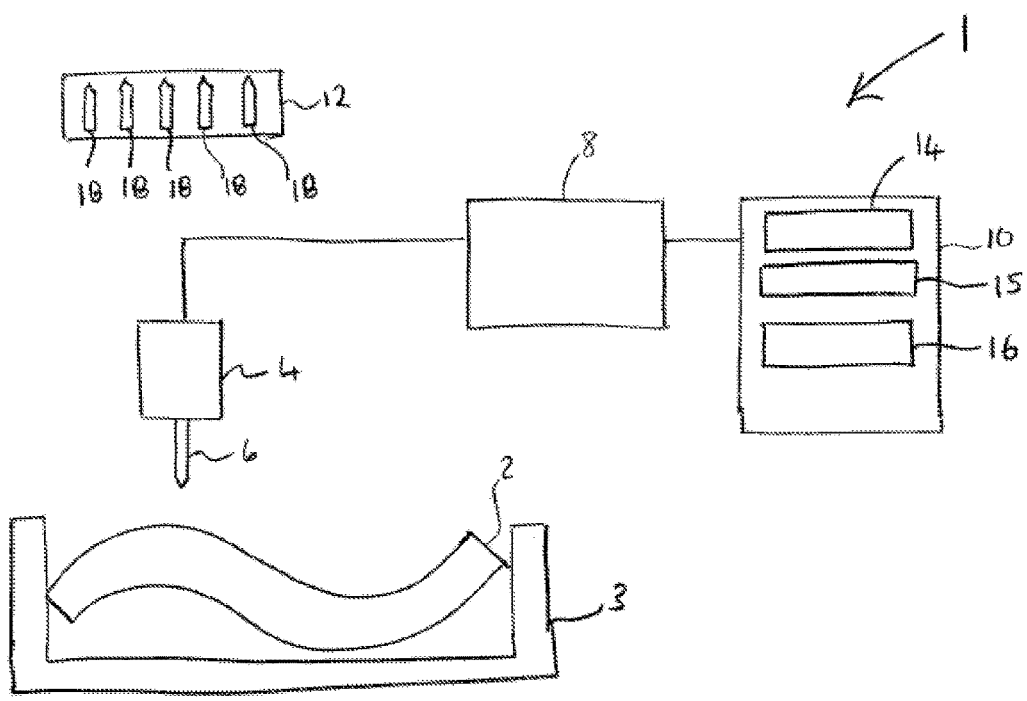
FIG. 1 is a schematic illustration (not to scale) of an environment in which a drilling process is performed configured in accordance with one embodiment of the invention.

FIG. 1 is a schematic illustration (not to scale) of an example of an environment 1 in which an embodiment of a drilling process is performed. The drilling process is described in more detail later below with reference to FIG. 3.

The terminology "drilling process" is used herein to refer to any type of drilling, cutting, or machining process including, but not limited to, fusion cutting, flame cutting, sublimation cutting, drilling a hole, countersinking (a pre-drilled hole), reaming, orbital drilling, etc.

In this embodiment, the environment 1 comprises an aircraft panel 2 to be drilled, a fixture system 3, a robot arm 4 comprising a drill bit 6, a controller 8, a processor 10, and a tool storage 12.

The aircraft panel 2 is made of carbon fiber. The aircraft panel 2 is to be fixed to an airframe of an aircraft to form an external skin of the aircraft.

The fixture system 3 comprises a frame in which the aircraft panel 2 is fixed, for example, using a plurality of clamps. The fixture system 3 is configured to restrict or prevent movement of the aircraft panel 2 during the drilling operation. The fixture system 3 may comprise a jig, the framework of which may be made by joining standard galvanized steel beams.

The robot arm 4 is a conventional industrial robot arm, or robotic arm, such as a six axis serial arm robot, for example a KR360 robot arm manufactured by Kuka Gmbh (Trademark). The robot arm 4 has at least six degree of freedom.

The drill bit 6 is coupled to an end of the robot arm 4 such that the robot arm 4 may move the drill bit 6 into contact with the aircraft panel 2, and drill into the aircraft panel 2. The drill bit 6 is an end effector of the robot arm 4.

The robot arm 4 and the drill bit 6 can be conveniently thought of as a single module, e.g. a drilling module.

In some embodiments, optionally, and in addition to the robot arm 4, a further robot arm may be used to support the aircraft panel 2 during the drilling process and act as an "anvil". The further robot arm may be located opposite to the robot arm 4. The further robot arm may be configured to contact with the aircraft panel 2 opposite to the drill bit 6 so as to prevent or oppose deflection of the aircraft panel 2 during the drilling process. The further robot arm may, for example, be a KR180 or KR360 robot arm manufactured by Kuka Gmbh (Trademark).

The robot arm 4 is coupled to the controller 8 such that the controller 8 controls movement of the robot arm 4. The drill bit 6 is coupled to the controller 8 such that the controller 8 may activate and deactivate the drill bit 6.

The controller 8 is coupled to the processor 10 such that the processor 10 may send instructions for controlling the robot arm 4 to the controller 8. The controller 8 is configured to control the robot arm 4 and drill bit 6 in accordance with the instructions received from the processor 10.

In this embodiment, the processor 10 comprises a drill program 14, a status module 15, and a tool life module 16.

The drill program 14 specifies the sequence of instructions to be sent to the controller 8 with which the controller 8 controls the robot arm 4. In this embodiment, the drill program 14 specifies a tool path for the drill bit 6. Also, the drill program specifies 14 a plurality of holes that are to be drilled into the aircraft panel 2. The holes specified by the drill program 14 are arranged into a plurality of groups of holes, which are hereinafter referred to as "segments". Thus, the tool path for the drill bit 6 specified by the drill program 14 is partitioned into a plurality of tool path segments. In this embodiment, the tool path segments are a sequence of path segments that make up a continuous tool path. The drill program 14 is described in more detail later below with reference to FIG. 2.

The status module 15 maintains a list comprising a current status of each of the holes specified by the drill program 14. The list maintained by the status module 15 also comprises a current status of each of the segments specified by the drill program 14. The statuses specified by the status module 15 are described in more detail later below with reference to FIG. 2.

The tool life module 16 is configured to maintain a current tool life value of the drill bit 6 currently attached to the robot arm 4. In this embodiment, a tool life value of a drill bit or other cutting tool specifies a number of holes that that cutting tool may be used to drill before that cutting tool is to be discarded. As described in more detail later below with reference to FIG. 3, the tool life module 16 updates the tool life value of the drill bit 6 currently attached to the robot arm 4 as holes are drilled into the aircraft panel 2 using that drill bit 6.

The tool storage 12 is a storage facility that stores a plurality of further drill bits 18. The tool storage 12 is located proximate to the robot arm 4 such that, in operation, the robot arm 4 may return the drill bit 6 to the tool storage 12 and such that the robot arm 4 may retrieve a further drill bit 18 from the tool storage 12, and use the retrieve further drill bit 18 to drill the aircraft panel 2.

Figure 2:
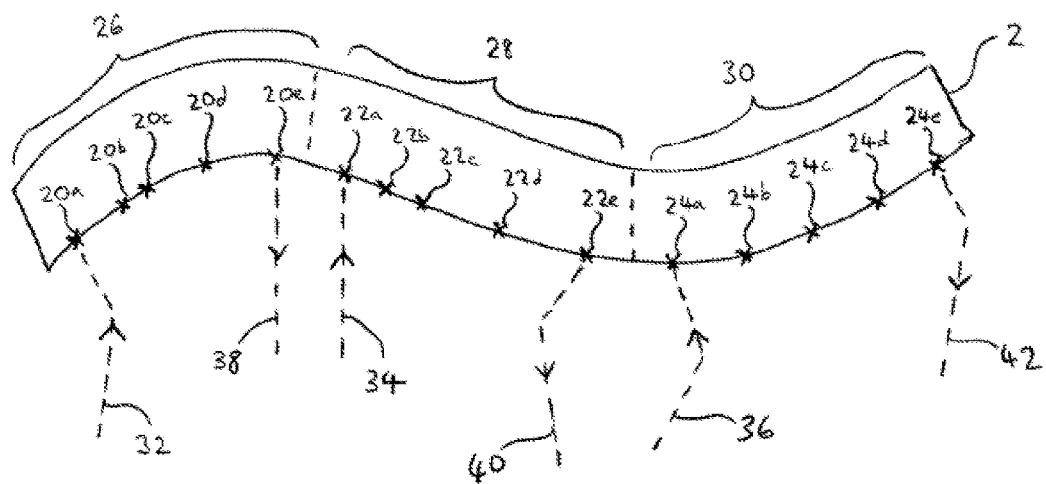
FIG. 2 is a schematic illustration (not to scale) showing an aircraft panel and illustrating a drilling program configured in accordance with one embodiment of the invention.

FIG. 2 is a schematic illustration (not to scale) showing the aircraft panel and illustrating the drill program 14.

In this embodiment, the drill program 14 specifies, inter alia, a plurality of holes 20a-e, 22a-e, 24a-e that are to be drilled into the aircraft panel 2. In this embodiment, there are fifteen holes. The drill program 14 may specify, for each hole 20a-e, 22a-e, 24a-e, a location on the surface of the aircraft panel 2 for that hole, and an axis/direction for that hole.

The drill program 14 specifies a plurality of groups into which the holes 20a-e, 22a-e, 24a-e are arranged. These groups of holes are hereinafter referred to as "segments". In this embodiment, there are three segments, namely a first segment 26, a second segment 28, and a third segment 30. Each segment 26, 28, 30 comprises five holes. Particular, the first segment 26 includes the holes labelled in FIG. 2 using the reference numerals 20a, 20b, 20c, 20d, and 20e. Also, the second segment 28 includes the holes labelled in FIG. 2 using the reference numerals 22a, 22b, 22c, 22d, and 22e. Also, the third segment 30 includes the holes labelled in FIG. 2 using the reference numerals 24a, 24b, 24c, 24d, and 24e. In this embodiment, each hole belongs to exactly one segment 26, 28, 30.

The drill program 14 specifies an order in which the holes 20a-e, 22a-e, 24a-e are to be drilled. Thus, the drill program 14 species a sequence of holes. In this embodiment, the holes are to be drilled in the following order: the first hole of the first segment 20a, the second hole of the first segment 20b, the third hole of the first segment 20c, the fourth hole of the first segment 20d, the fifth hole of the first segment 20e, the first hole of the second segment 22a, the second hole of the second segment 22b, the third hole of the second segment 22c, the fourth hole of the second segment 22d, the fifth hole of the second segment 22e, the first hole of the third segment 24a, the second hole of the third segment 24b, the third hole of the third segment 24c, the fourth hole of the third segment 24d, and the fifth hole of the third segment 24e.

Each segment 26, 28, 30 comprises holes that are consecutive in the sequence of holes (i.e. that are to be drilled directly after each other). Thus, each segment 26, 28, 30 comprises a sub-sequence of the sequence of holes.

In this embodiment, the drill program 14 describes a tool path to be followed by the drill bit 6 and the robot arm 4 to drill the sequence holes 20a-e, 22a-e, 24a-e. In other words, the drill program 14 specifies a tool path that passes through the holes 20a-e, 22a-e, 24a-e in the aforementioned order.

The drill program 14 specifies, for each segment 26, 28, 30, an entry path. In particular, the drill program 14 specifies, a first entry path 32 for the first segment 26, a second entry path 34 for the second segment 28, and a third entry path 36 for the third segment 30. The entry paths 32, 34, 36 are indicated in FIG. 2 by dotted arrows pointing towards the aircraft panel 2. An entry path for a segment is a route or path from a point remote from the aircraft panel 2 and fixture system 3 to the location on the aircraft panel 2 of the first hole of that segment (i.e. the first hole of that segment in the sequence of holes, i.e. the hole of that segment that is to be drilled first in the drilling process). Thus for example, first entry path 32 is a route from a point remote from the aircraft panel 2 to the location of the first hole 20a of the first segment 26. In this embodiment, the entry paths 32, 34, 36 are paths along which the robot arm 4 may move the drill bit 6.

In some embodiments, a point that is remote from the aircraft panel 2 and fixture system 3 is a position for the robot arm 4 such that the robot arm 4 and drill bit 6 are at least 100 mm, or more preferably 110 mm, from the aircraft panel 2 and fixture system 3.

Each entry path 32, 34, 36 is a route that avoids contact of the robot arm 4 (and drill bit 6 attached thereto) with the aircraft panel 2 and fixture system 3. Thus, a risk damage to the aircraft panel 2, the fixture system 3, the robot arm 4, or the drill bit 6 as a result of the robot arm 4 or drill 6 impacting with the aircraft panel 2 and/or fixture system 3 when the robot arm 4 approaches the aircraft panel 2 advantageously tends to be reduced or eliminated.

Each entry path 32, 34, 36 may have been determined by a human operator following a detailed analysis of the aircraft panel 2 coupled to the fixture system 3, the dimensions and capabilities of the robot arm 4, etc.

The drill program 14 specifies, for each segment 26, 28, 30, an exit path. In particular, the drill program 14 specifies, a first exit path 38 for the first segment 26, a second exit path 40 for the second segment 28, and a third exit path 42 for the third segment 30. The exit paths 38, 40, 42 are indicated in FIG. 2 by dotted arrows pointing away from the aircraft panel 2. An exit path for a segment is a route or path, from the location on the aircraft panel 2 of the last hole of that segment (i.e. the last hole of that segment in the sequence of holes, i.e. the hole of that segment that is to be drilled last in the drilling process) to a location remote from the aircraft panel 2 and the fixture system 3. Thus for example, first exit path 38 is a route from the location on the aircraft panel 2 of the fifth hole 202 of the first segment 26 to a point remote from the aircraft panel 2. In this embodiment, the exit paths 38, 40, 42 are paths along which the robot arm 4 may move the drill bit 6.

Each exit path 38, 40, 42 is a route that avoids contact of the robot arm 4 (and drill bit 6 attached thereto) with the aircraft panel 2 and fixture system 3. Thus, a risk damage to the aircraft panel 2, the fixture system 3, the robot arm 4, or the drill bit 6 as a result of the robot arm 4 or drill 6 impacting with the aircraft panel 2 and/or fixture system 3 when the robot arm 4 moves away from the aircraft panel 2 advantageously tends to be reduced or eliminated.

Each exit path 38, 40, 42 may have been determined by a human operator following a detailed analysis of the aircraft panel 2 coupled to the fixture system 3, the dimensions and capabilities of the robot arm 4, etc.

Referring back to the functionality of the status module 15, in this embodiment the status module 15 maintains a list of current statuses of the holes 20a-e, 22a-e, 24a-e and the segments 26, 28, 30.

A status of a hole 20a-e, 22a-e, 24a-e may be either (i) "undrilled" if that hole has not yet been fully drilled in the aircraft panel 2, or "drilled" if that hole has been drilled in the aircraft panel 2.

A status of a segment 26, 28, 30 may be either (i) "complete" if all holes in that segment have yet been fully drilled; (ii) "not started" if all holes in that segment have not been drilled to any extent; or (iii) "in progress" if one or more, but not all, of the holes in that segment have been drilled or if the first hole of that segment is the next hole in the sequence to be drilled.

Figure 3:
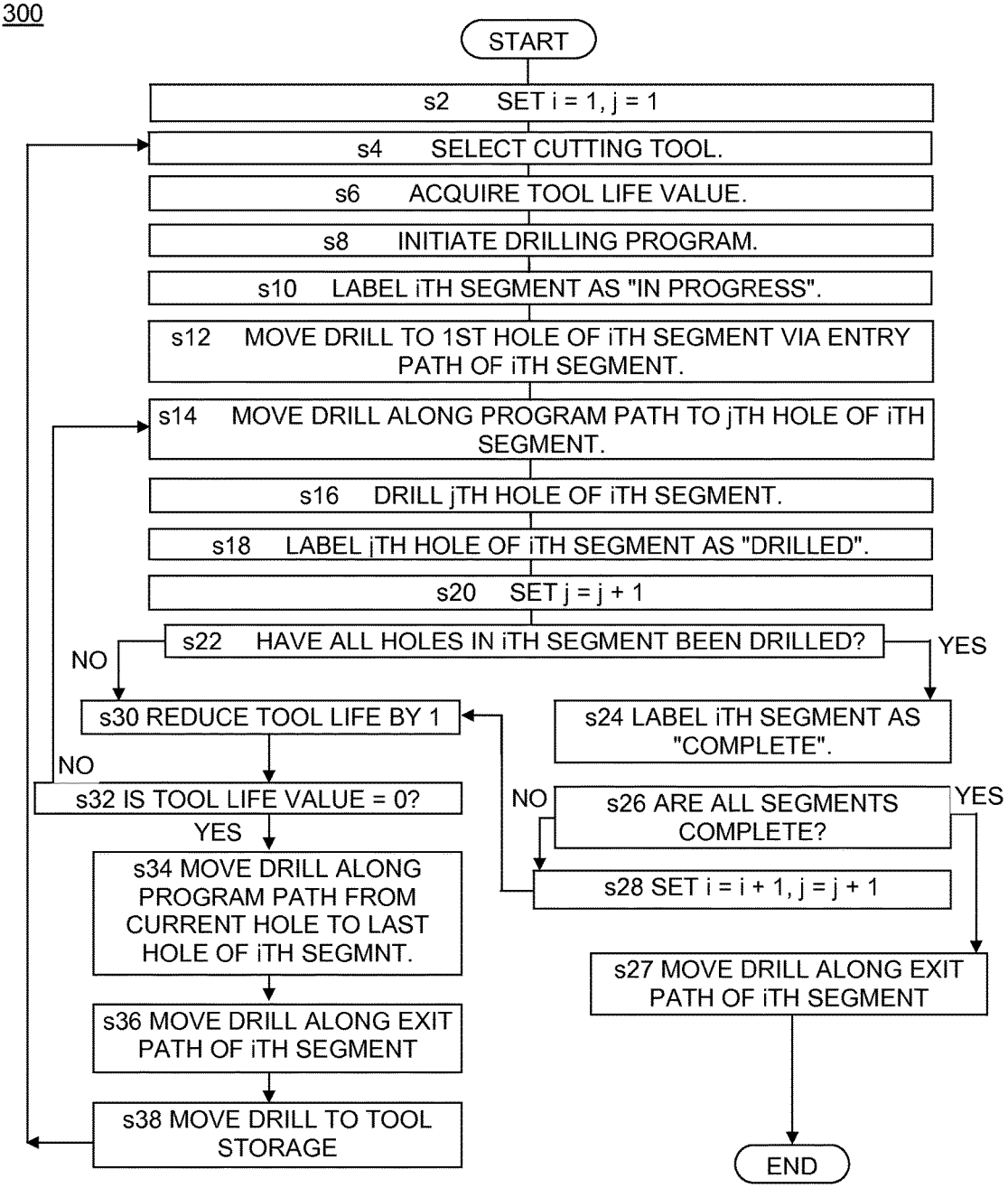
FIG. 3 is a process flow chart showing certain steps of an embodiment of a drilling process configured in accordance with the invention.

FIG. 3 is a process flow chart showing certain steps of an embodiment of a drilling process.

At step s2, the processor 10 sets values of a first index i and a second index j to be equal to one, i.e. the processor 10 sets i=1 and j=1.

At step s4, the robot arm 4 retrieves a cutting tool from the tool storage 12. In this embodiment, the first cutting tool retrieved by the robot arm 4 is the drill bit 6.

At step s6, the tool life module 16 acquires a current tool life value of the cutting tool currently attached to the robot arm 4. Thus, in a first iteration of step s6, the tool life module 16 acquires a current tool life value of the drill bit 6.

The tool life module 16 may acquire tool life values from any appropriate source. For example, tool life values may be acquired from a database of tool life values that is coupled to the processor 10, or a tool life value may be input to the processor 10 by a human operator.

At step s8, the drilling program is initiated. The processor 10 may send the information specified in the drill program 14 to the controller 8, and the controller 8 may control the robot arm 4 and drill bit 6 in accordance with the received information.

At step s10, the status module 15 ensures that the status of the ith segment is "in progress". Thus, in a first iteration of step s10, the status module 15 changes the status of the first segment 26 from "not started" to "in progress".

At step s12, in accordance with the drill program 14, the controller 8 controls the robot arm 4 such that the cutting tool currently attached to the robot arm 4 is moved along the entry path of the ith segment, from a point remote from the aircraft panel 2 and the fixture system 3 to the location on the aircraft panel 2 of the first hole of the ith segment. Thus, in a first iteration of step s12, the robot arm 4 is controlled such that the drill bit 6 is moved along the first entry path 32 from a point remote from the aircraft panel 2 to the location of the first hole 20a of the first segment 26.

Collisions between the robot arm 4 and the aircraft panel 2 or fixture system 3 tend to be advantageously avoided. Also, collisions between the current cutting tool and the aircraft panel 2 or fixture system 3 tend to be advantageously avoided.

At step s14, the controller 8 controls the robot arm 4 such that the cutting tool currently attached to the robot arm 4 is moved along tool path specified by the drill program 14 to the jth hole of the ith segment. Thus, in a first iteration of step s14, the robot arm 4 is controlled such that the drill bit 6 is moved along the specified tool path to the first hole 20a of the first segment 26.

At step s16, in accordance with the drill program 14, the controller 8 controls the robot arm 4 to drill, using the attached cutting tool, the jth hole of the ith segment. Thus, in a first iteration of step s16, the robot arm 4 is controlled to drill, using the drill bit 6 the first hole 20a of the first segment 26.

At step s18, the status module 15 changes the status of the jth hole of the ith segment from "undrilled" to "drilled". In other words, the status of the hole that was drilled at step s16 is changed to "drilled". Thus, in a first iteration of step s18, the status module 15 labels the first hole 20a of the first segment 26 as "drilled".

At step s20, the processor 10 increases the value of the second index j by one, i.e. the processor 10 sets j=j+1.

At step s22, the processor 10 determines whether or not all holes of the ith segment have been fully drilled. In some embodiments, the status module 15 determines whether or not the status of each of the holes of the ith segment is "drilled".

If, at step s22, it is determined that all holes of the ith segment have been drilled, the method proceeds to step s24.

However, if at step s22 it is determined that all holes of the ith segment have not been drilled, the method proceeds to step s30. Step s30 and subsequent method steps are described in more detail later below after a description of method steps s24 to s28.

At step s24, it has been determined that all holes of the ith segment have been drilled, and the status module 15 changes the status of the ith segment from "in progress" to "complete".

At step s26, the processor 10 determines whether or not all the holes specified in the drill program 14 have been drilled. In this embodiment, this is performed by the status module 15 determining whether or not the status of each of the segments 26, 28, 30 is "complete".

If, at step s26, it is determined that all of the segments 26, 28, 30 are labelled as "complete", i.e. all the holes are labelled as "drilled", the method proceeds to step s27.

However, if at step s26 it is determined that all of the segments 26, 28, 30 are not labelled as "complete", the method proceeds to step s28.

At step s27, the controller 8 controls the robot arm 4 such that the cutting tool currently attached to the robot arm 4 is moved along the exit path of the ith segment, from the location on the aircraft panel 2 of the last hole of the ith segment to a point remote from the aircraft panel 2 and the fixture system 3. Thus, in this embodiment, after all of the holes 20a-e, 22a-e, 24a-e has been drilled, the robot arm 4 is controlled such that the current cutting tool is moved along the third exit path 42 from the location of the fifth hole 24e of the third segment 30 to point remote from the aircraft panel 2 and the fixture system 3.

After step s27, the process of FIG. 3 ends.

Returning now to the case where, at step s26, it is determined that all of the segments 26, 28, 30 are not labelled as "complete", at step s28 the processor 10 increases the value of the first index j by one, and sets the value of the second index j to be 1, i.e. the processor 10 sets i=i+1 and j=1.

After step s28, the process proceeds to step s30.

At step s30, the tool life module 16 reduces the tool life value of the cutting tool currently attached to the robot arm 4 by one. Thus, in a first iteration of step s30, the tool life module 16 reduces the tool life value of the drill bit 6 by one.

At step s32, the tool life module 16 determines whether or not the tool life value of the cutting tool currently attached to the robot arm 4 is equal to zero. In other words, the tool life module 16 determines whether or not the current cutting tool should be replaced.

If, at step s32, it is determined that the tool life value of the cutting tool currently attached to the robot arm 4 is not equal to zero, the method proceeds to back to step s14. After returning to step s14, the cutting tool is moved along the tool path specified by the drill program 14 to the next hole to be drilled in the sequence.

However, if at step s32 it is determined that the tool life value of the cutting tool currently attached to the robot arm 4 is equal to zero, a subroutine of the drill program is initiated and the method proceeds to step s34.

At step s34, the controller 8 controls the robot arm 4 such that the cutting tool currently attached to the robot arm 4 is moved along tool path specified by the drill program 14 to the location of the last hole of the ith segment. In this embodiment, no further holes are drilled during step s34, i.e. the cutting tool is moved along the drill path without drilling any further holes. For example, if it is determined that the tool life value of the drill bit 6 is equal to zero during drilling of the first segment 26 (e.g. after drilling of the third hole 20c of the first segment 26 is complete), the robot arm 4 is controlled such that the drill bit 6 is moved along the specified tool path, without drilling the fourth or fifth holes 20d, 20e of the first segment 26, to the location of the fifth hole 20e of the first segment 26.

At step s36, the controller 8 controls the robot arm 4 such that the cutting tool currently attached to the robot arm 4 is moved along the exit path of the ith segment, from the location on the aircraft panel 2 of the last hole of the ith segment to a point remote from the aircraft panel 2 and the fixture system 3. For example, if it has been determined that the tool life value of the drill bit 6 is equal to zero during drilling of the first segment 26, and the drill bit 6 has been moved along the tool path to the location of the fifth hole 20e of the first segment 26, the drill bit 6 is then moved along the first exit path 38. Collisions between the robot arm 4 and the aircraft panel 2 or fixture system 3 are advantageously avoided. Also, collisions between the current cutting tool and the aircraft panel 2 or fixture system 3 are advantageously avoided.

At step s38, the controller 8 controls the robot arm 4 such that the cutting tool currently attached to the robot arm 4 is returned to the tool storage 12. For example, after its tool life value has been reduced to zero, the drill bit 6 is discarded to the tool storage 12.

After step s38, the method of FIG. 3 returns to step s4 where the robot arm 4 selects, from the tool storage 12, a new drill bit, for example, a previously unselected drill bit (e.g. one of the further drill bits 18). After selection of the new drill bit, the robot arm 4 is controlled to return the new drill bit to the location of the next undrilled hole in the "in progress" section (i.e. the ith section), via the entry path of that section. In this embodiment, when the new drill bit is moved to the location of the next undrilled hole of the ith section, the robot arm 4 is controlled to move the new drill bit along the entry path of the ith, "in progress", section, and then along the tool path of that section to the next "undrilled" hole via the previously "drilled" holes.

Thus, a drilling process is provided.

In this embodiment, the offline program specifies a tool path that is partitioned into multiple segments, each containing a plurality of holes. Each segment has an entry and exit path that may have been specifically defined by a human programmer to ensure no clash condition exists. If a tool life value decrements to zero during the drilling process, a tool change sub routine is initiated and the robot arm automatically skip through the remaining holes of the segment without cutting them, and subsequently moves away from the aircraft panel via the exit path defined in the offline program. Once away from the aircraft panel, the robot arm continues to its home position, and then changes cutting tools and the tool storage. When returning to the aircraft panel, the robot arm follows the defined entry path for the "in progress" segment, and skips holes already completed until arriving at the next hole to be drilled.

An advantage of the above provided countersinking process, is that the process is performed using commercially available, "off-the-shelf" industrial robots. Furthermore, it tends to be possible to use the same robots to perform the countersinking/drilling process on any type of panel or part, and on any shape of panel or part. Thus, the use of relatively expensive machine tools tends to be advantageously avoided.

The robots used in the above described countersinking process may use different sized/shaped cutting tools. Thus, the robots may be used to perform many types of machining operations. To account for different sizes/shapes of cutting tools, a size (e.g. a length) of a cutting tool may be measured accurately on a Kelch pre-setter. This data, along with other data e.g. like tool number, tool life value etc., may be stored on a Radio Frequency Identification (RFID) chip attached to the chuck. When a cutting tool is selected from the tool storage, the data stored on the RFID chip may be read by a reader linked to the controlling robot arm and controller. The system may then determine, for example, which tool it is using, how many holes it can drill before the tool must be changed, and the length of the tool. The tool length may be used in the determination of how far along its axis the cutting tool should be moved in order to drill into the aircraft panel to a desired pre-determined depth.

The tool life value is advantageously be monitored by decrementing the available life of a tool each time a hole is drilled with that tool, and storing the decremented tool life on the RFID chip for that tool, at the processor and/or at another storage device.

The above described method and apparatus advantageously tends to avoid collision of the robot arm and drill bit with the aircraft panel and fixture system, for example, during a tool change process. The method and apparatus may be implemented with workpieces and fixture systems that have relatively complex (such as highly curved) shapes.

The automatic changing of a cutting tool when its life expires tends to be provided.

Using the above method, cutting tool usage tends to be maximized. Thus, tool costs tend to be reduced.

The above described tool change and tracking process tends not to rely on manual intervention.

Advantageously, using the above described method, a need for recording a current position of the robot arm and drill bit, for example upon initiating a tool change process, tends to be reduced or eliminated.

The maintaining of statuses of the segments and the holes by the status module advantageously tend to facilitate the skipping of undrilled holes by the robot arm (e.g. when the tool change subroutine is initiated), and tend to facilitate the skipping of previously drilled holes by the robot arm (e.g. when returning to the aircraft panel after tool change).

The partitioning of the holes into segments, and the defining of an entry/exit path for each segment advantageously tends to eliminate the specifying of an entry and/or exit path for each hole. This tends to simplify a drill program and a specification thereof.

The partitioning of the holes into segments, and the defining of an entry/exit path for each segment advantageously tends provide that, to reach an exit path, the robot arm does not move via the location of every undrilled hole in the sequence when the tool change subroutine is initiated.

The partitioning of the holes into segments, and the defining of an entry/exit path for each segment advantageously tends provide that, to reach the next hole to be drilled, the robot arm does not move via the location of every previously drilled hole in the sequence after tool change has been performed.

Apparatus, including the processor, for implementing the above arrangement, and performing the above described method steps, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowchart of FIG. 3, and described above may be omitted or such process steps may be performed in differing order to that presented above and shown in FIG. 3. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the drilling process is implemented to drill hole in an object. However, in other embodiments, a different type of drilling or cutting process is used to form or machine different features in an object.

In the above embodiments, the object being drilled is an aircraft panel. However, in other embodiments, a different type of object is drilled, for example, a different type of aircraft component.

In the above embodiments, the fixture system comprises a frame onto which the object to be drilled is clamped. However, in other embodiments, a different type of support structure is used, for example, a support structure that is coupled to the object in a different appropriate way, i.e. other than using clamps.

In the above embodiments, a robot arm is implemented to perform the drilling process. However, in other embodiments a different type of system is used to implement the drilling process.

In the above embodiments, a tool life value of a drill bit or other cutting tool specifies a number of holes that that cutting tool may be used to drill before that cutting tool is discarded. However, in other embodiments tool life is specified in a different way, for example, a tool life value may specify a tool life in terms of one or more different types of cutting operation instead of or in addition to drilling holes. In some embodiment, the tool life is specified in terms of an amount of time that tool may be used for. This time value may be reduced each time a hole is drilled by the time taken to drill that hole.

In the above embodiments, the drill program specifies fifteen holes which are grouped in to three segments, each of which consists of five holes. However, in other embodiments the drill program specifies a different number of holes. In some embodiments, the holes may be grouped into a different number of segments. In some embodiments, one or more of the segments consists of a different number of holes (i.e. other than five). For example, in some embodiments, the drill program specifies five hundred holes which are grouped in to twenty-five segments, each of which consists of twenty holes.

In the above embodiments, the drill program specifies separate entry and exit paths for each segment. The entry path of a segment is a path that leads to the first hole of that segment. The exit path of a segment is a path that leads from the last hole of that segment.

However, in other embodiments, the entry and exit paths for one or more of the segments are not separate, for example, a common path may provide both exit and entry paths to a segment. The robot arm may be controlled to move along the common path towards the object to be drilled when that common path is to serve as an entry path, and the robot arm may be controlled to move along the common path in an opposite direction, away from the object, when that common path is to serve as an exit path.

In some embodiments, the entry path of a segment is a path that leads to a different hole of that segment, i.e. a hole other than the first hole of that segment.

In some embodiments, the exit path of a segment is a path that away leads from a different hole of that segment, i.e. a hole other than the last hole of that segment.

The foregoing description of the embodiments of the invention has been presented for the purposes of illustration and description. It is not intended to be exhaustive or to limit the invention to the precise form disclosed. Many modifications and variations are possible in light of this disclosure it is to be understood that other similar embodiments may be used or modifications or additions may be made to the described embodiment for performing the same function of the present invention without deviating therefrom. It is intended that the scope of the invention be limited not by this detailed description, but rather by the claims appended hereto.

What is claimed is:

1. A method of machining a workpiece (2), the method comprising:
   specifying a tool path for a cutting tool (6), the tool path being a path along which a cutting tool (6) is to be moved during machining, by the cutting tool (6), of the workpiece (2), wherein the tool path comprises a plurality of tool path segments (26, 28, 30);
   defining, for each tool path segment (26, 28, 30), an exit point, wherein the exit point of a tool path segment (26, 28, 30) is a point on that tool path segment (26, 28, 30);
   defining, for each tool path segment (26, 28, 30), an exit path (38, 40, 42), wherein the exit path (38, 40, 42) of a tool path segment (26, 28, 30) is a path for the cutting tool (6) from the exit point of that tool path segment (26, 28, 30) to a point that is remote from the workpiece (2);
   specifying a sequence comprising a plurality of machining points along the tool path, each machining point being a point along the tool path at which a respective feature is to be machined into the workpiece, wherein each tool path segment includes one or more machining points and wherein the exit point of a tool path segment is located at a last machining point within that tool path segment;
   performing a machining process including moving the cutting tool (6) along at least part of the tool path and machining, by the cutting tool (6), the workpiece (2); and,
   during the machining process, responsive to determining that one or more criteria are satisfied:

interrupting the machining process and moving the cutting tool (6) along a current tool path segment (26, 28, 30), skipping through the remaining machining points of the segment without machining them, from a current location of the cutting tool (6) to the exit point of the current tool path segment (26, 28, 30); and moving the cutting tool (6) along the exit path (38, 40, 42) of the current tool path segment (26, 28, 30), wherein:

the machining process includes, for each of the machining points the cutting tool (6) is moved to, controlling the cutting tool (6) to machine the corresponding feature (20, 22, 24) into the workpiece (2); and the method further comprises:

for each machining point, assigning, to that machining point, either a first label or a second label, wherein the first label is assigned to a machining point if the feature (20, 22, 24) corresponding to that machining point has not been machined, and the second label is assigned to a machining point if the feature (20, 22, 24) corresponding to that machining point has been machined;

defining, for each tool path segment (26, 28, 30), an entry point, wherein the entry point of a tool path segment (26, 28, 30) is a point on that tool path segment (26, 28, 30);

defining, for each tool path segment (26, 28, 30), an entry path (32, 34, 36), wherein the entry path (32, 34, 36) of a tool path segment (26, 28, 30) is a path for the cutting tool (6) from a point that is remote from the workpiece (2) to the entry point of that tool path segment (26, 28, 30);

responsive to determining that one or more criteria are satisfied, identifying the first machining point in the sequence to which the first label is assigned; and after the cutting tool (6) has been moved along the exit path (38, 40, 42) of the current tool path segment (26, 28, 30), moving the cutting tool (6) along the entry path (32, 34, 36) of the tool path segment (26, 28, 30) containing the identified machining point to the entry point of the tool path segment (26, 28, 30) containing the identified machining point.

2. The method according to claim 1, wherein the one or more criteria comprises a criterion that a tool life of the cutting tool (6) is equal to a predetermined threshold value.

3. The method according to claim 1, the method further comprising, after the cutting tool (6) has been moved along the exit path (38, 40, 42) of the current tool path segment (26, 28, 30), replacing the cutting tool (6) with a further cutting tool (18).

4. The method according to claim 1, the method further comprising:

defining, for each tool path segment (26, 28, 30), an entry point, wherein the entry point of a tool path segment (26, 28, 30) is a point on that tool path segment (26, 28, 30);

defining, for each tool path segment (26, 28, 30), an entry path (32, 34, 36), wherein the entry path (32, 34, 36) of a tool path segment (26, 28, 30) is a path for the cutting tool (6) or a further cutting tool (18) from a point that is remote from the workpiece (2) to the entry point of that tool path segment (26, 28, 30); and after the cutting tool (6) has been moved along the exit path (38, 40, 42) of the current tool path segment (26, 28, 30), controlling the cutting tool (6) or a further cutting tool (18) to move along the entry path (32, 34, 36) of the current tool path segment (26, 28, 30) to the entry point of the current tool path segment (26, 28, 30).

5. The method according to claim 4, further comprising, thereafter, controlling the cutting tool (6) or the further cutting tool (18) to move along the current tool path segment (26, 28, 30) without machining the workpiece (2), from the entry point of the current tool path segment (26, 28, 30) to the location of the cutting tool (6) when the machining process was interrupted.

6. The method according to claim 5, further comprising, thereafter, resuming the machining process.

7. The method according to claim 1, wherein:

the machining process includes, for each of the machining points the cutting tool (6) is moved to, controlling the cutting tool (6) to machine the corresponding feature (20, 22, 24) into the workpiece (2);

the method further comprises, for each feature (20, 22, 24) machined by the cutting tool (6), modifying a tool life value of the cutting tool (6); and the one or more criteria comprises a criterion that a tool life of the cutting tool (6) is equal to a predetermined threshold value.

8. The method according to claim 1, wherein: the method further comprises:

defining, for each tool path segment (26, 28, 30), an entry point, wherein the entry point of a tool path segment (26, 28, 30) is a point on that tool path segment (26, 28, 30); and defining, for each tool path segment (26, 28, 30), an entry path (32, 34, 36), wherein the entry path (32, 34, 36) of a tool path segment (26, 28, 30) is a path for the cutting tool (6) from a point that is remote from the workpiece (2) to the entry point of that tool path segment (26, 28, 30); and the entry point of a tool path segment (26, 28, 30) is located at or proximate to a first machining point within that tool path segment (26, 28, 30).

9. An aircraft component machined using a method comprising:

specifying a tool path for a cutting tool (6), the tool path being a path along which a cutting tool (6) is to be moved during machining, by the cutting tool (6), of the aircraft component, wherein the tool path comprises a plurality of tool path segments (26, 28, 30);

defining, for each tool path segment (26, 28, 30), an exit point, wherein the exit point of a tool path segment (26, 28, 30) is a point on that tool path segment (26, 28, 30);

defining, for each tool path segment (26, 28, 30), an exit path (38, 40, 42), wherein the exit path (38, 40, 42) of a tool path segment (26, 28, 30) is a path for the cutting tool (6) from the exit point of that tool path segment (26, 28, 30) to a point that is remote from the aircraft component;

specifying a sequence comprising a plurality of machining points along the tool path, each machining point being a point along the tool path at which a respective feature is to be machined into the workpiece, wherein each tool path segment includes one or more machining points and wherein the exit point of a tool path segment is located at a last machining point within that tool path segment;

performing a machining process including moving the cutting tool (6) along at least part of the tool path and machining, by the cutting tool (6), the aircraft component; and, during the machining process, responsive to determining that one or more criteria are satisfied:

interrupting the machining process and moving the cutting tool (6) along a current tool path segment (26, 28, 30), skipping through the remaining machining points of the segment without machining them, from a current location of the cutting tool (6) to the exit point of the current tool path segment (26, 28, 30); and moving the cutting tool (6) along the exit path (38, 40, 42) of the current tool path segment (26, 28, 30) wherein:

the machining process includes, for each of the machining points the cutting tool (6) is moved to, controlling the cutting tool (6) to machine the corresponding feature (20, 22, 24) into the aircraft component; and the method further comprises:

for each machining point, assigning, to that machining point, either a first label or a second label, wherein the first label is assigned to a machining point if the feature (20, 22, 24) corresponding to that machining point has not been machined, and the second label is assigned to a machining point if the feature (20, 22, 24) corresponding to that machining point has been machined;

defining, for each tool path segment (26, 28, 30), an entry point, wherein the entry point of a tool path segment (26, 28, 30) is a point on that tool path segment (26, 28, 30);

defining, for each tool path segment (26, 28, 30), an entry path (32, 34, 36), wherein the entry path (32, 34, 36) of a tool path segment (26, 28, 30) is a path for the cutting tool (6) from a point that is remote from the aircraft component to the entry point of that tool path segment (26, 28, 30);

responsive to determining that one or more criteria are satisfied, identifying the first machining point in the sequence to which the first label is assigned; and after the cutting tool (6) has been moved along the exit path (38, 40, 42) of the current tool path segment (26, 28, 30), moving the cutting tool (6) along the entry path (32, 34, 36) of the tool path segment (26, 28, 30) containing the identified machining point to the entry point of the tool path segment (26, 28, 30) containing the identified machining point.

10. An apparatus for machining a workpiece (2), the apparatus comprising:

machining apparatus including a cutting tool (6);

one or more processors (10) configured to store:

a tool path for the cutting tool (6), the tool path being a path along which the cutting tool (6) is to be moved during machining, by the cutting tool (6), of the workpiece (2), wherein the tool path comprises a plurality of tool path segments (26, 28, 30), each segment (26, 28, 30) comprising an exit point, wherein the exit point of a tool path segment (26, 28, 30) is a point on that tool path segment (26, 28, 30);

a sequence comprising a plurality of machining points along the tool path, each machining point being a point along the tool path at which a respective feature is to be machined into the workpiece, wherein each tool path segment includes one or more machining points and wherein the exit point of a tool path segment is located at a last machining point within that tool path segment; and, for each tool path segment (26, 28, 30), an exit path (38, 40, 42), wherein the exit path (38, 40, 42) of a tool path segment (26, 28, 30) is a path for the cutting tool (6) from the exit point of that tool path segment (26, 28, 30) to a point that is remote from the workpiece (2);

a controller (8) operatively coupled to the one or more processors (10) and the machining apparatus and configured to:

control the machining apparatus to move the cutting tool (6) along at least part of the tool path and to machine the workpiece (2);

for each of the machining points the cutting tool (6) is moved to, control the cutting tool (6) to machine the corresponding feature (20, 22, 24) into the workpiece (2); and, for each machining point, assign, to that machining point, either a first label or a second label, wherein the first label is assigned to a machining point if the feature (20, 22, 24) corresponding to that machining point has not been machined, and the second label is assigned to a machining point if the feature (20, 22, 24) corresponding to that machining point has been machined;

define, for each tool path segment (26, 28, 30), an entry point, wherein the entry point of a tool path segment (26, 28, 30) is a point on that tool path segment (26, 28, 30);

define, for each tool path segment (26, 28, 30), an entry path (32, 34, 36), wherein the entry path (32, 34, 36) of a tool path segment (26, 28, 30) is a path for the cutting tool (6) from a point that is remote from the workpiece (2) to the entry point of that tool path segment (26, 28, 30);

responsive to determining that one or more criteria are satisfied:

identify the first machining point in the sequence to which the first label is assigned;

control the machining apparatus to move the cutting tool (6) along a current tool path segment (26, 28, 30), skipping through the remaining machining points of the segment without machining them, from a current location of the cutting tool (6) to the exit point of the current tool path segment (26, 28, 30); and control the machining apparatus to move the cutting tool (6) along the exit path (38, 40, 42) of the current tool path segment (26, 28, 30); and after the cutting tool (6) has been moved along the exit path (38, 40, 42) of the current tool path segment (26, 28, 30), moving the cutting tool (6) along the entry path (32, 34, 36) of the tool path segment (26, 28, 30) containing the identified machining point to the entry point of the tool path segment (26, 28, 30) containing the identified machining point.

11. A non-transient machine readable storage medium storing a program or at least one of the plurality of programs arranged such that when executed by a computer system or one or more processors it/they cause the computer system or the one or more processors to operate in accordance with a method of machining a workpiece (2) comprising:

specifying a tool path for a cutting tool (6), the tool path being a path along which a cutting tool (6) is to be moved during machining, by the cutting tool (6), of the workpiece (2), wherein the tool path comprises a plurality of tool path segments (26, 28, 30);

defining, for each tool path segment (26, 28, 30), an exit point, wherein the exit point of a tool path segment (26, 28, 30) is a point on that tool path segment (26, 28, 30);

defining, for each tool path segment (26, 28, 30), an exit path (38, 40, 42), wherein the exit path (38, 40, 42) of a tool path segment (26, 28, 30) is a path for the cutting tool (6) from the exit point of that tool path segment (26, 28, 30) to a point that is remote from the workpiece (2);

specifying a sequence comprising a plurality of machining points along the tool path, each machining point being a point along the tool path at which a respective feature is to be machined into the workpiece, wherein each tool path segment includes one or more machining points and wherein the exit point of a tool path segment is located at a last machining point within that tool path segment;

performing a machining process including moving the cutting tool (6) along at least part of the tool path and machining, by the cutting tool (6), the workpiece (2); and, during the machining process, responsive to determining that one or more criteria are satisfied:

interrupting the machining process and moving the cutting tool (6) along a current tool path segment (26, 28, 30), skipping through the remaining machining points of the segment without machining them, from a current location of the cutting tool (6) to the exit point of the current tool path segment (26, 28, 30); and moving the cutting tool (6) along the exit path (38, 40, 42) of the current tool path segment (26, 28, 30) wherein:

the machining process includes, for each of the machining points the cutting tool (6) is moved to, controlling the cutting tool (6) to machine the corresponding feature (20, 22, 24) into the workpiece (2); and the method further comprises:

for each machining point, assigning, to that machining point, either a first label or a second label, wherein the first label is assigned to a machining point if the feature (20, 22, 24) corresponding to that machining point has not been machined, and the second label is assigned to a machining point if the feature (20, 22, 24) corresponding to that machining point has been machined;

defining, for each tool path segment (26, 28, 30), an entry point, wherein the entry point of a tool path segment (26, 28, 30) is a point on that tool path segment (26, 28, 30);

defining, for each tool path segment (26, 28, 30), an entry path (32, 34, 36), wherein the entry path (32, 34, 36) of a tool path segment (26, 28, 30) is a path for the cutting tool (6) from a point that is remote from the workpiece (2) to the entry point of that tool path segment (26, 28, 30);

responsive to determining that one or more criteria are satisfied, identifying the first machining point in the sequence to which the first label is assigned; and after the cutting tool (6) has been moved along the exit path (38, 40, 42) of the current tool path segment (26, 28, 30), moving the cutting tool (6) along the entry path (32, 34, 36) of the tool path segment (26, 28, 30) containing the identified machining point to the entry point of the tool path segment (26, 28, 30) containing the identified machining point.

\* \* \* \* \*